United States Patent
Yip

(10) Patent No.: US 9,110,224 B2
(45) Date of Patent: Aug. 18, 2015

(54) REFLECTOR WITH FOCUSED OUTPUT

(75) Inventor: Chak Lam Peter Yip, Hong Kong (CN)

(73) Assignee: TRI-CONCEPT TECHNOLOGY LIMITED, Hong Kong (CN)

(*) Notice: Subject to any disclaimer, the term of this patent is extended or adjusted under 35 U.S.C. 154(b) by 403 days.

(21) Appl. No.: 13/580,970

(22) PCT Filed: Mar. 1, 2011

(86) PCT No.: PCT/IB2011/050852
§ 371 (c)(1),
(2), (4) Date: Aug. 24, 2012

(87) PCT Pub. No.: WO2011/107931
PCT Pub. Date: Sep. 9, 2011

(65) Prior Publication Data
US 2012/0320586 A1    Dec. 20, 2012

Related U.S. Application Data

(60) Provisional application No. 61/310,255, filed on Mar. 3, 2010.

(51) Int. Cl.
| F21V 7/06 | (2006.01) |
| G02B 5/10 | (2006.01) |
| H01Q 19/12 | (2006.01) |
| H01Q 19/18 | (2006.01) |
| G02B 19/00 | (2006.01) |
| F21W 111/06 | (2006.01) |
| F21Y 101/02 | (2006.01) |

(52) U.S. Cl.
CPC ... *G02B 5/10* (2013.01); *F21V 7/06* (2013.01); *G02B 19/0023* (2013.01); *G02B 19/0061* (2013.01); *H01Q 19/12* (2013.01); *H01Q 19/18* (2013.01); *F21W 2111/06* (2013.01); *F21Y 2101/02* (2013.01)

(58) Field of Classification Search
CPC .......... F21V 7/00; F21V 7/04; F21V 7/0083; F21V 7/06; F21V 7/09; H01Q 19/12; H01Q 19/18; G02B 19/0023; G02B 19/0061; G02B 5/10; F21Y 2101/02; F21W 2111/06
USPC ................ 362/516–518, 241, 243, 247, 341, 362/296.01, 297, 296.05–296.08
See application file for complete search history.

(56) References Cited

U.S. PATENT DOCUMENTS

| 5,258,897 A | 11/1993 | Nino |
| 6,493,096 B1* | 12/2002 | Maeda et al. ................. 356/612 |
| 2010/0091507 A1* | 4/2010 | Li et al. ........................ 362/470 |

FOREIGN PATENT DOCUMENTS

| CN | 1114726 A | 1/1996 |
| JP | 9-129004 A | 5/1997 |
| JP | 2003-249106 A | 9/2003 |

*Primary Examiner* — Bao Q Truong
(74) *Attorney, Agent, or Firm* — Eagle IP Limited; Jacqueline C. Lui

(57) ABSTRACT

A reflector with focused output is disclosed. The reflector comprises a reference parabolic portion and a plurality of non-reference parabolic portions. A focal length of the plurality of non-reference parabolic portions is determined from a focal length of the reference parabolic portion. In one embodiment, the focal length of the plurality of non-reference parabolic portions is a perpendicularly projected distance from a focus of the reference parabolic portion onto a central axis of the plurality of non-reference parabolic portions. In one embodiment, the focal lengths of the reference parabolic portion and the plurality of non-reference parabolic portions are scaled by a constant. A method of designing a reflector and an obstruction light that uses the reflector is also disclosed.

16 Claims, 13 Drawing Sheets

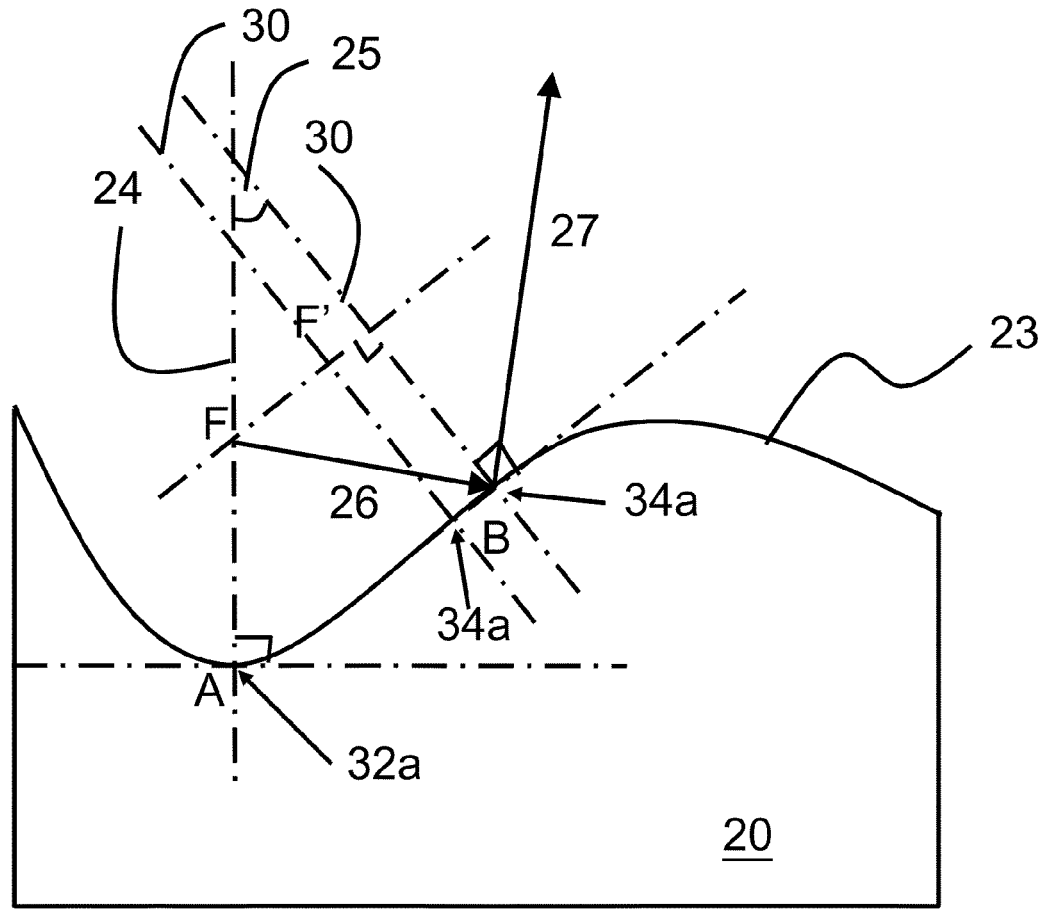
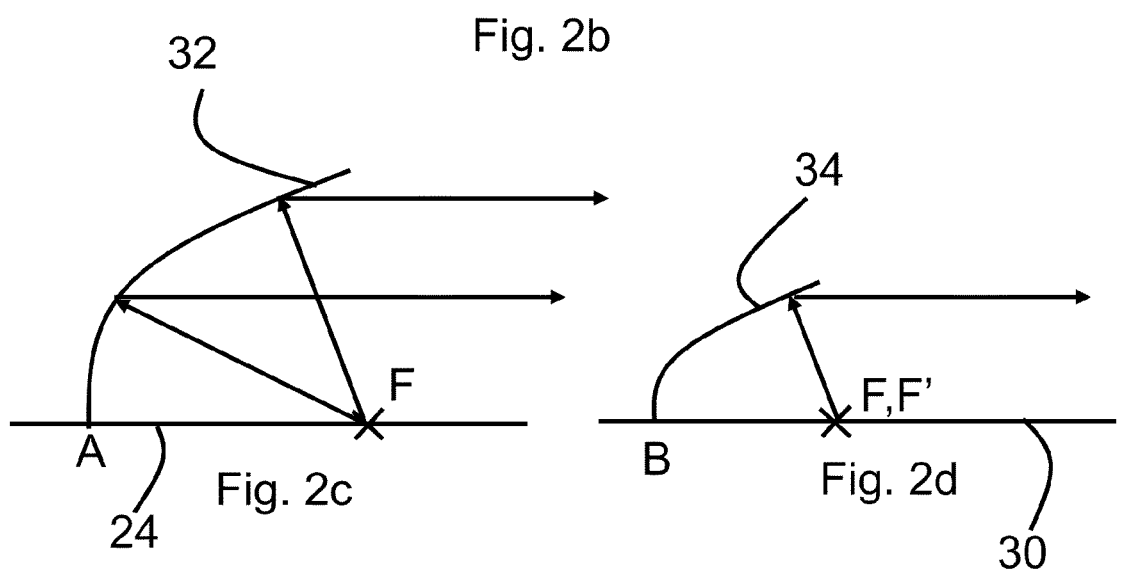
Fig. 2b
Fig. 2c
Fig. 2d

REFLECTOR WITH FOCUSED OUTPUT

CROSS-REFERENCE TO RELATED APPLICATION

This application claims benefit under 35 U.S.C. §119(e) of U.S. Provisional Application having Ser. No. 61/310,255 filed Mar. 3, 2010, which is hereby incorporated by reference herein in its entirety.

FIELD OF INVENTION

This invention relates to a reflector, and in particular a reflector with focused output.

BACKGROUND OF INVENTION

A planar parabolic reflector focuses a wave such as a light beam along the parabolic plane, as shown in the prior art FIG. 1. However, the intensity profile along the plane perpendicular to the parabolic plane is fixed and it is not versatile enough to be used in specific applications.

SUMMARY OF INVENTION

In the light of the foregoing background, it is an object of the present invention to provide an alternate reflector with focused output.

Accordingly, the present invention, in one aspect, is a reflector comprising a reference parabolic portion and a plurality of non-reference parabolic portions. A focal length of the plurality of non-reference parabolic portions is determined from a focal length of the reference parabolic portion.

In an exemplary embodiment of the present invention, the focal length of the plurality of non-reference parabolic portions is a perpendicularly projected distance from a focus of the reference parabolic portion onto a central axis of the plurality of non-reference parabolic portions.

In another exemplary embodiment, the focal lengths of the reference parabolic portion and the plurality of non-reference parabolic portions are scaled by a constant. In yet another embodiment, the reflector comprises a concave portion and a convex portion.

According to another aspect of the present invention, a method of designing a reflector is disclosed. The method comprises the steps of determining a focus and focal length of a reference parabolic portion of said reflector and designing a reference line of said reflector at a reference plane. Then the method provides a non-reference parabolic portion at each point on said reference line, a focal length of the non-reference parabolic portion being a perpendicularly projected distance from the focus of the reference parabolic portion onto a central axis of the non-reference parabolic portion.

In another aspect of the invention, an obstruction light utilizing the illumination source of the present invention is disclosed. The obstruction light comprises a plurality of illumination sources, each illumination source comprising a light source and a light reflector. The light reflector comprises a plurality of non-reference parabolic portions and a reference parabolic portion, a focal length of the plurality of non-reference parabolic portions is determined from a focal length of the reference parabolic portion. The plurality of illumination sources are arranged uniformly around a circumference of the obstruction light There are many advantages to the present invention. One advantage is that the illumination source focuses the beam emitted from the light source in one dimension to one beam spread without restricting the beam spread in another dimension. As such, the beam spreads can be freely designed to meet any design requirements for any specific application. Also, the efficiency of the illumination source is increased because more light is directed to a desired direction by the light reflector.

BRIEF DESCRIPTION OF FIGURES

FIG. 2b is a cross sectional view of the reflector in FIG. 2a along a reference plane.

FIG. 2c is a side cross-sectional view of the reflector in FIG. 2a along a reference parabolic portion.

FIG. 2d is a side cross-sectional view of the reflector in FIG. 2a along a non-reference parabolic portion.

DETAILED DESCRIPTION OF THE PREFERRED EMBODIMENTS

Figure 1:
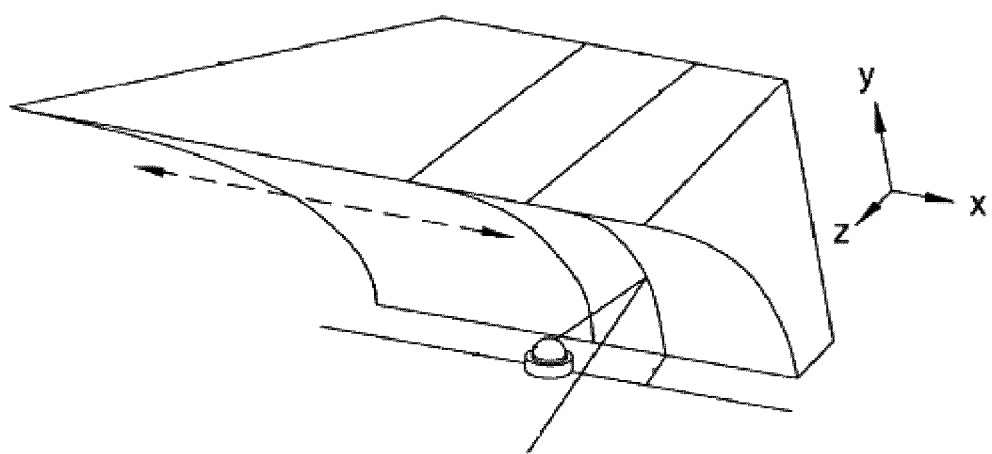
FIG. 1 is a perspective view of a planar parabolic reflector in a prior art document.

While the present invention is described herein with reference to illustrative embodiments for particular applications, it should be understood that the invention is not limited thereto.

Those skilled in the art with access to the teachings provided herein will recognize additional modifications, applications, and embodiments within the scope thereof and additional fields in which the invention would be of significant utility.

For the purposes of explaining the present invention, the reference plane of the embodiments as presented herein is a horizontal plane in a 3-dimensional coordinate system, e.g. x-y plane in Cartesian coordinate system or r-φ plane in a cylindrical coordinate system, with z=φ. The terms "horizontal plane", "reference plane", "x-y plane" and "r-φ plane" are interchangeably used in the following embodiments. It is clear to one skilled in the art that the reference plane can be in any orientation in a three dimension space. The term "central axis" means an axis that a parabola is symmetric about, and the term "center point" means the intersection point between a parabola and its central axis.

FIGS. 2a-2d show a reflector 20 according to a first embodiment of the present invention. The reflector 20 comprises a curved reflective surface 22 which is shown as AUVB in the figure. The reflective surface 22 comprises a reference line 23 along the reference plane. In this figure, only a section of the reflector 20 is shown for the purpose of describing the embodiment. The reflective surface 22 comprises a reference parabolic portion 32 and a plurality of non-reference parabolic portions such as those shown as 34 in the figure. A central axis 24 of the reference parabolic portion 32 is defined to lie on the reference plane (x-y plane), and is a normal perpendicular to a tangential plane of the reference line 23 at a reference point 32a. The reference point 32a is a center point of the reference parabolic portion 32. The reference parabolic portion 32 is a parabolic curve on the vertical plane that is formed by points P, Q, U, and A (hereafter referred as vertical plane PQUA). The reference parabolic portion 32 has a focus F, denoted as 33 in FIG. 2a. The distance between the reference point A 32a and focus F 33 is a focal length of the reference parabolic portion 32. Similarly, a plurality of second central axes 30 of the plurality of the non-reference parabolic portions 34 is a normal perpendicular to a tangential plane of the reference line 23 at points 34a. The plurality of the non-reference parabolic portions 34 is a parabolic curve on another vertical plane that is formed by points T, R, V and B (hereafter referred as vertical plane TRVB).

In an exemplary embodiment, the plurality of non-reference parabolic portions 34 is parabolic in a plane perpendicular to the reference plane, but they can have the same or different orientation than the reference parabolic portion 32. For example, the non-reference parabolic portion 34 at point B 34a is parabolic in a vertical plane TRVB has a different orientation than the vertical plane PQUA of the reference parabolic portion. In this example, the central axis 24 of the reference parabolic portion 32 intersects with the second central axis 30 of the non-reference parabolic portion 34 at an angle 25.

In another exemplary embodiment, a center point of the parabola at the plurality of non-reference parabolic portions 34 lies on the reference plane (z=0). For example, point B 34a, which lies on the reference plane, is the center point of the non-reference parabolic portion 34. In a further exemplary embodiment, the second central axis 30 of the plurality of non-reference parabolic portions is aligned to the reference plane. When the second central axis 30 is aligned to the reference plane, a focus F' of the non-reference parabolic portion 34, denoted as 35, lies on the reference plane.

In an exemplary embodiment, the focal length of the plurality of the non-reference parabolic portions 34 is determined from the reference parabolic portion 32. In a specific embodiment, the focus F' 35 of the non-reference parabolic portion 34 is the intersection of a perpendicularly projected line FF' from focus F 33 to the second central axis 30 along the reference plane (x-y plane). That means the focal length BF' of the non-reference parabolic portion 34 is functionally related to the focus F 33. In other words, the parabolic curvatures of the reference parabolic portion 32 and the non-reference parabolic portion 34 are different but are functionally related. The functional relationship will be discussed in subsequent paragraphs.

In an application of the reflector 20 of the present invention, the reflector 20 is used to reflect waves emitted from a wave source, herein described as "source". In different embodiments, the source can be a light source, an electromagnetic wave radiator, a heat source or a sound source. In an exemplary embodiment, the wave source is a point wave source. In a specific embodiment, the source is a light emitting diode. In an exemplary embodiment, the source is placed at the focus F 33 of the reference parabolic portion 32.

By definition of a parabola, an incident wave emitted from the focus will be reflected parallel to the central axis of the parabola. In this situation, it means that the reflected waves from the reference parabolic portion 32 are all horizontal. A ray diagram of the incident waves and the reflected waves at the reference parabolic portion 32 along the plane PQUA is shown in FIG. 2c. Here all the reflected rays are parallel to the reference plane.

Figure 2A:
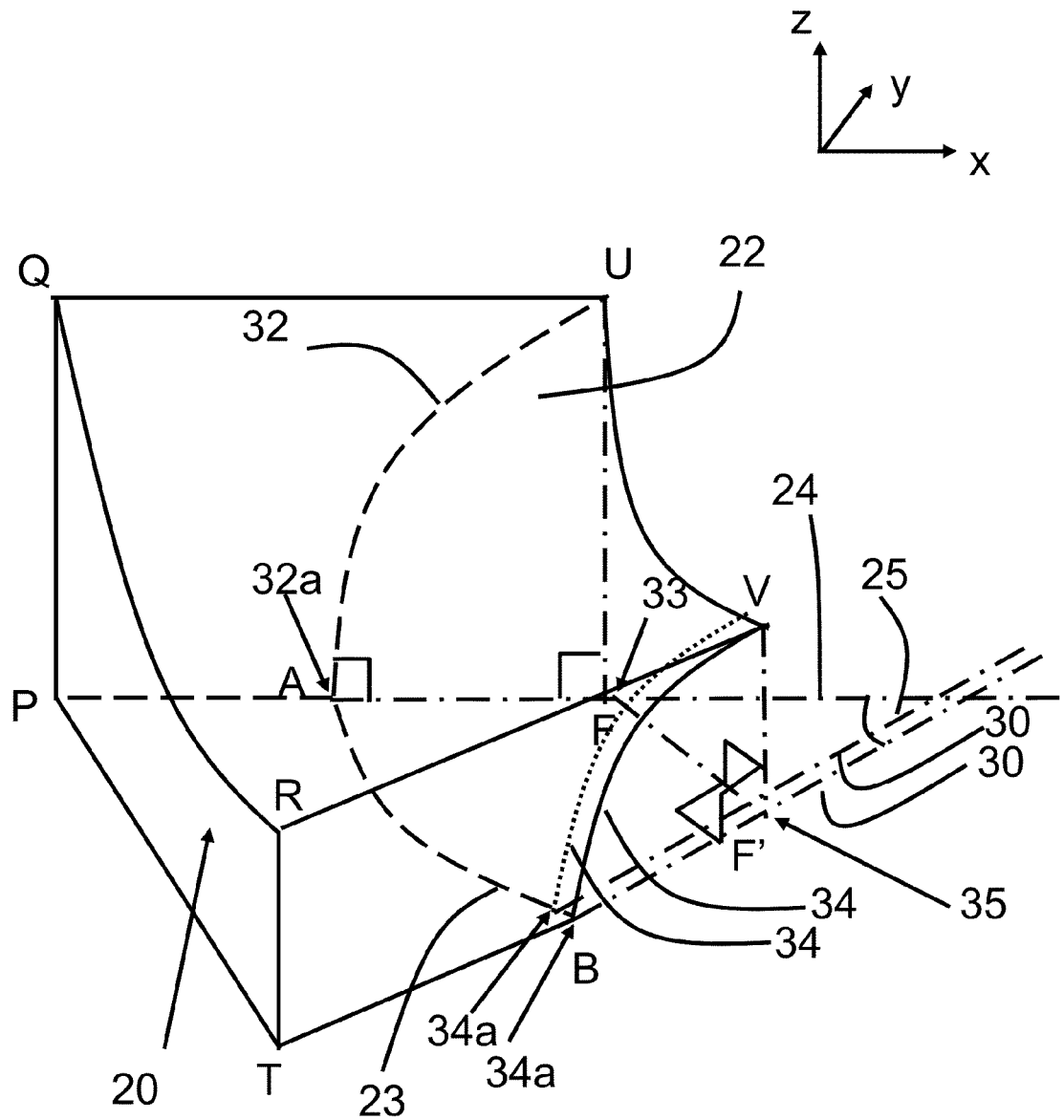
FIG. 2a is a perspective view of a reflector according to an embodiment of the present invention.

FIGS. 2b and 2d show ray diagrams of the incident waves and the reflected waves at the non-reference parabolic portion 34 at different views. FIG. 2b shows a cross sectional view of the reflector 20 along the reference plane (x-y plane), whereas FIG. 2d shows a side view of the reflector 20 at the non-reference portion 34 along the plane TRVB. When an incident ray from F hits any points on reflective surface of the non-reference parabolic portion 34, the reflective ray can be analyzed by decoupling the incident and reflective rays into the horizontal component (x-y plane) and its vertical component (z-axis). Along the x-y plane as shown in FIG. 2a, an incident ray 26 emitted from source at F will be reflected at point B to become reflected ray 27. As shown in FIG. 2b, the horizontal direction of the reflected ray 27 depends on the angle 25. Along the z-axis, the reflected ray can be analyzed with the help of FIG. 2d. Since the non-reference parabolic portion 34 is a parabola with focus F' 35, any rays that are emitted from F' 35 will be reflected by this parabola so that the reflected rays are parallel to the x-y plane. Notice that the focus F' 35 is the intersection of a perpendicularly projected line FF' from focus F 33 to the second central axis 30 along the reference plane (x-y plane). Thus the foci 33 and 35 are effectively the same point when looked from the side, as shown in FIG. 2d. Hence rays emitted from F 33 that hits the plurality of non-reference parabolic portions 34 will be reflected parallel to the x-y plane when analyzed along the vertical direction (z-axis) as shown in FIG. 2d.

By repeating this method for every non-reference parabolic portion, or at least only for the portions that are unobstructed from the source, it is able to construct a system that outputs all or a majority of the reflected waves to be horizontal. The focal length of each non-reference parabolic portion will vary according to the shape of the reference line 23 and the focal length of the reference parabolic portion 32. If the reference line 23 is a straight line, then the reflector 20 constructed will be the same as the one as shown in FIG. 1. The horizontal beam spread profile is not in any way limited in the present invention and can be arbitrarily designed for specific applications as discussed more below.

In mathematical terms, the above reflective surface 22 can be represented by the expression $$r - f_i = \frac{1}{4f_i}z^2,$$

where $f_i$ is the focal length of the parabolic portion through a point i, where i is an arbitrary point on the reference line 23 such as reference point A 32a or point B 34a, and r is the horizontal distance from an origin of a cylindrical coordinate system, which is set at the focus of the parabolic portion through the point i, to the reflective surface 22 at a height z. The equation of the reference line 23 is represented by an expression $M(x,y)=0$, where M can be any arbitrary function.

It is noticed that the above expression resembles the standard expression for a parabola. Therefore if every point on the reflective surface 22 satisfies this expression, then the reflected waves will all be parallel to the reference plane when the source is placed at the focus 33 of the reference parabolic portion 32. The waves that are not reflected by the reflector 20 remains spread out in all directions from the source.

Figure 3A:
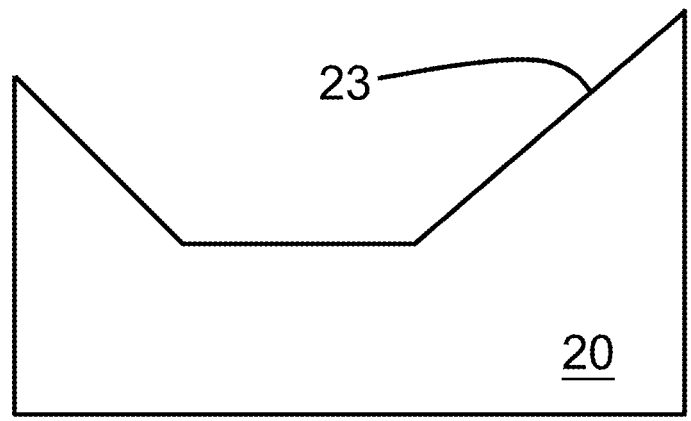
FIG. 3a is a cross sectional view of a reflector with a piecewise reference line along a reference plane, according to another embodiment of the present invention.
Figure 3B:
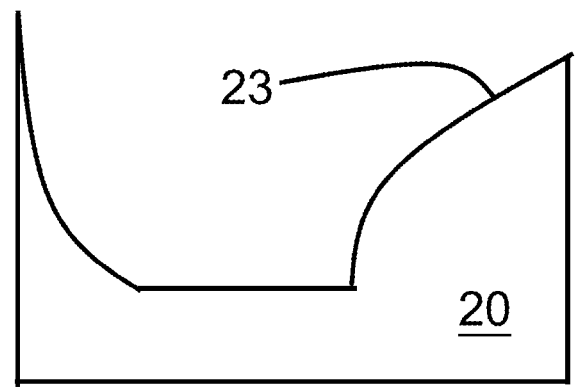
FIG. 3b is a cross sectional view of a reflector with a reference line comprising a combination of curves and straight lines along a reference plane, according to another embodiment of the present invention.
Figure 3C:
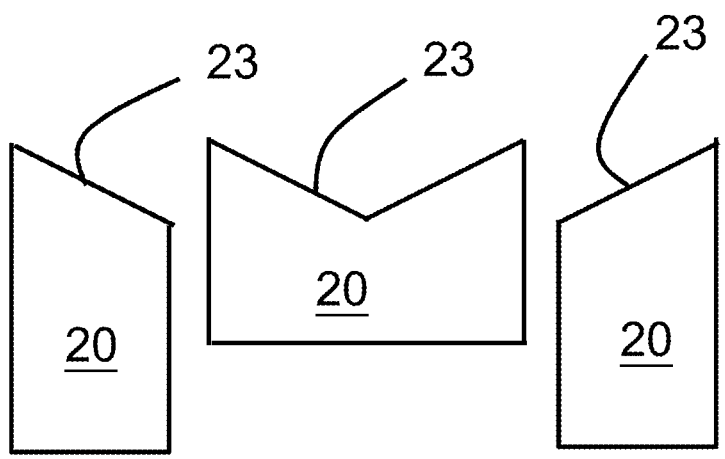
FIG. 3c is a cross sectional view of a reflector with a discontinuous reference line along a reference plane, according to another embodiment of the present invention.

The reference line 23 does not need to be a smooth curve as shown in FIG. 2a. For example, the reflective surface 22 can be a piecewise linear straight line as shown in FIG. 3a. A piecewise linear reference line 23 means the reflective surface 22 is piecewise instead of continuous as in the case of FIG. 2. In different embodiments as shown in FIGS. 3b and 3c, $M(x,y)=0$ can comprise a combination of curves and straight lines, and can have discontinuities.

The reflector 20 having an arbitrary function $M(x,y)=0$ at the reference plane means that the horizontal profile is freely designable. For example, it is possible to focus the wave intensity along this plane to a desired spread. In one embodiment, a segmented wave intensity profile is achieved using piecewise linear or segmented reflectors. In another embodiment, the non-uniform intensity profile of the source can be compensated by a suitable design of the reflector 20 such that the reflected horizontal spread is more uniform. For example, a source such as a light emitting diode has a sharp cone-shaped intensity profile. The reflector can be designed such that the reflected intensity profile is less sharp.

The reflector 20 can be designed to diverge or converge reflected waves vertically other than reflecting the waves to be parallel to the reference plane. In one embodiment of the present invention, the curvatures of the reference parabolic portion 32 and the plurality of non-reference parabolic portions are all scaled by a constant k. In mathematical terms, this is represented by the expression $$r - f_i = \frac{k}{4f_i}z^2,$$

which k is smaller than 1 for diverging wave (less curvature) and greater than 1 for converging wave (more curvature). In the embodiment as shown in FIG. 2a where the reflector 20 is only defined for $z>=0$, diverging means upwards and converging means downwards. This scaling is effectively changing the ratio of the focal length to the distance between the reference parabolic portion 32 and the source, therefore the same effect will occur if the focal length stays the same but the distance between the reference parabolic portion 32 and the source is altered. In one embodiment, different parabolic portions in the same light reflector 20 can have a different constant k. For example, k is 1 at the reference portion for parallel output and is 0.8 at some non-reference portion for diverging output.

In general, a method for designing the above reflector comprises the following steps. First, the focal point and the focal length of the reference parabolic portion are determined, and the reference line is designed to achieve a desired horizontal spread. Then the focal lengths of the non-reference parabolic portions are determined as the perpendicularly projected distance from the focus of the reference parabolic portion onto the second central axis of that non-reference parabolic portion.

In different embodiments, the method further comprises the steps of tilting the reflector, scaling the focal length of the reflector at the reference parabolic portion, scaling the focal length of the reflector only at the non-reference parabolic portions, or a combination of the above steps.

Figure 4:
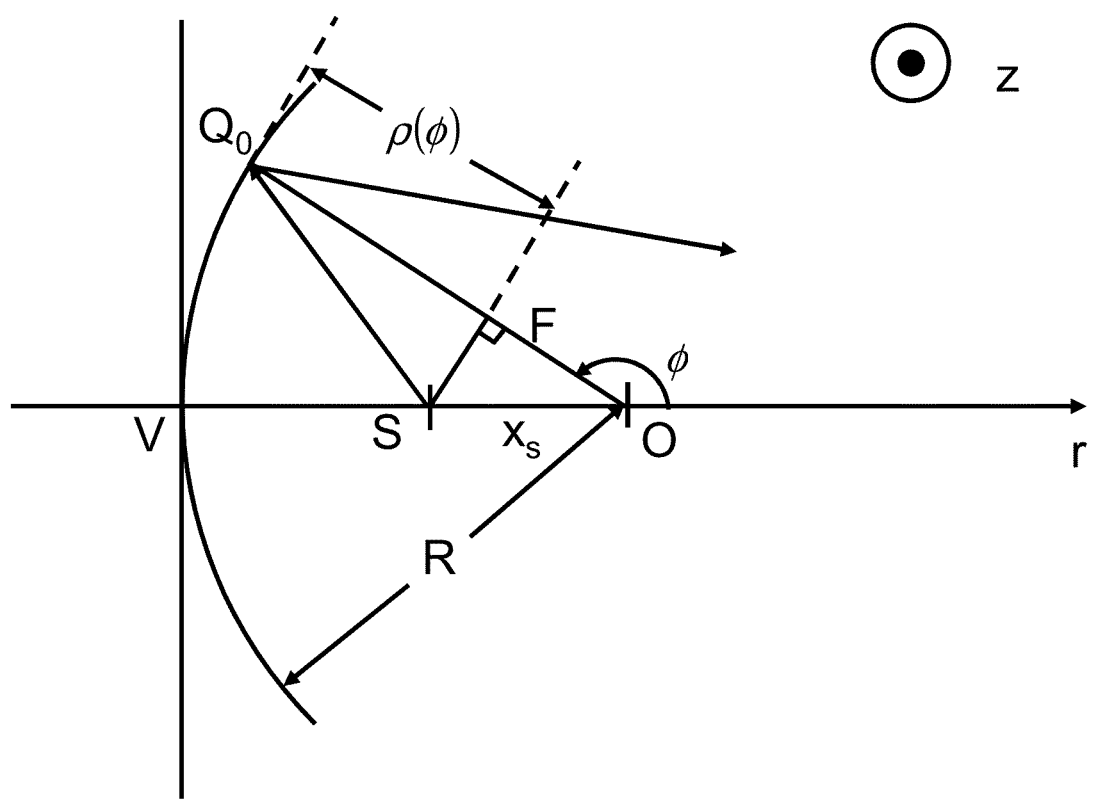
FIG. 4 is a cross sectional view of a reflector along a reference plane in which the reflector is a concave arc at the reference plane, according to an embodiment of the present invention.

FIG. 4 shows a cross-section view of a specific embodiment along the reference plane. In this embodiment, $M(x,y)=0$ is a concave arc. Let the center of the concave arc be an origin O of a 3-dimensional coordinate system such as a cylindrical coordinate system, i.e. $(r=0, \phi=0, z=0)$, and the concave arc has a radius of curvature R. The center point of the reference parabolic portion V of the reflector is represented by $(r=R, \phi=\pi, z=0)$, and the center point of a non-reference parabolic portion $Q_0$, which is an arbitrary point on the reference line is represented by $(r=R, \phi=\phi, z=0)$. A source S is placed along the central axis of the reference parabolic portion at a distance closer than the radius of curvature of $M(x,y)=0$, represented by $(r=R-L_S=x_S, \phi=\pi, z=0)$, where $L_S$ is the distance between the source S and the center point of the reference parabolic portion V. F is the perpendicularly projected point from the source S to the arbitrary point $Q_0$. The distance $Q_0F$, which is the perpendicularly projected focal length of the non-reference parabolic portion at $Q_0$, is a function of $\phi$, and is denoted as $\rho(\phi)$.

Figure 5:
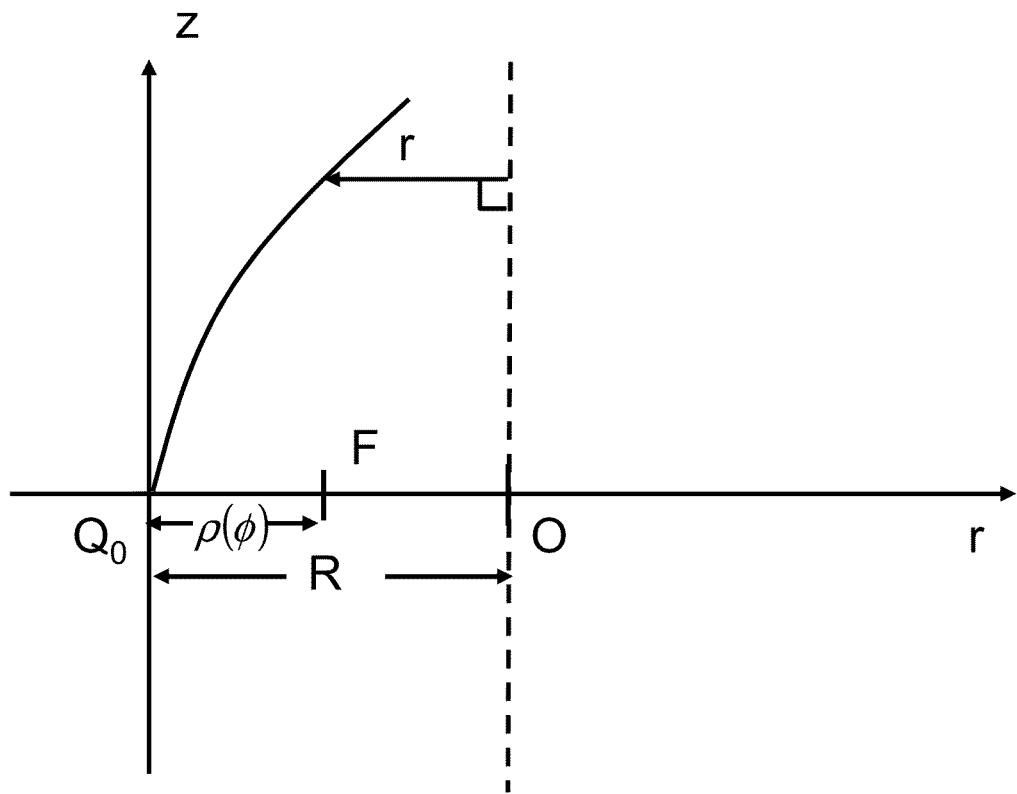
FIG. 5 is a side cross-sectional view of the reflector in FIG. 4 along a non-reference parabolic portion, according to an embodiment of the present invention.

FIG. 5 shows a side view of the reflector of FIG. 4 at the non-reference parabolic portion at $Q_0$ along the vertical plane formed by a vertical line parallel to the z-axis and line $Q_0O$. The equation defining the reflective surface at $Q_0$ along this plane is in the form of a parabola, and is described by $$\frac{z^2}{4\rho(\phi)} = R - r.$$

As $Q_oF = R - x_s \cos(\pi-\phi) = R + (R-L_s)\cos\phi$, the horizontal distance between the origin and the reflector at an arbitrary angle and height can be found as $$r = R - \frac{k}{4[R + (R - L_s)\cos\phi]}z^2 \qquad \text{eq. (1)}$$

Similar to above, setting k=1 produces horizontal beams, while k<1 produces diverging beams and k>1 produces converging beams.

Figure 6:
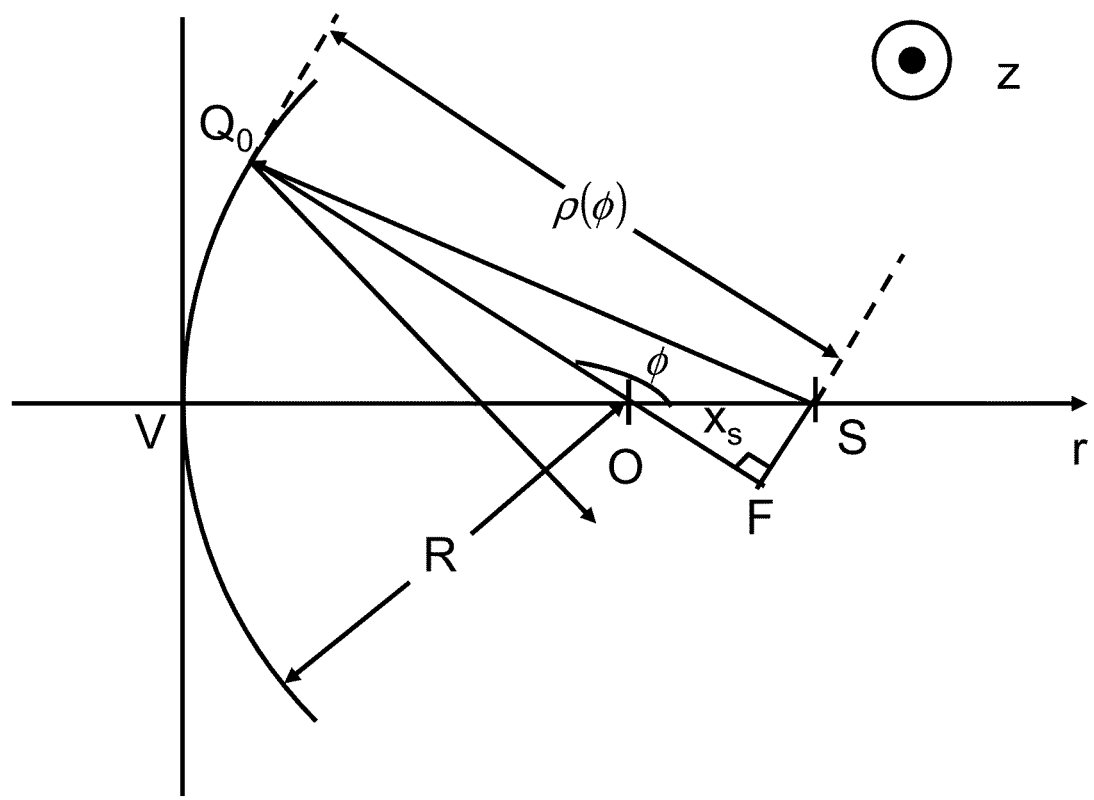
FIG. 6 is a cross sectional view of a reflector along a reference plane in which the reflector is a concave arc at the reference plane, according to another embodiment of the present invention.

FIG. 6 shows the case when the light source S is placed farther away from the origin O. Ls is now $R+x_s$, and S becomes $(r=x_s, \phi=0, z=0)$. Now since $Q_oF = R + x_s \cos(\pi-\phi) = R + (L_s-R)(-\cos\phi) = R + (R-L_s)\cos\phi$, the equation will then become $$r = R - \frac{k}{4[R + (R - L_s)\cos\phi]}z^2 \qquad \text{eq. (2)}$$

which is exactly the same as eq. (1). At R=Ls, $$r = R - \frac{k}{4R}z^2.$$

Figure 7:
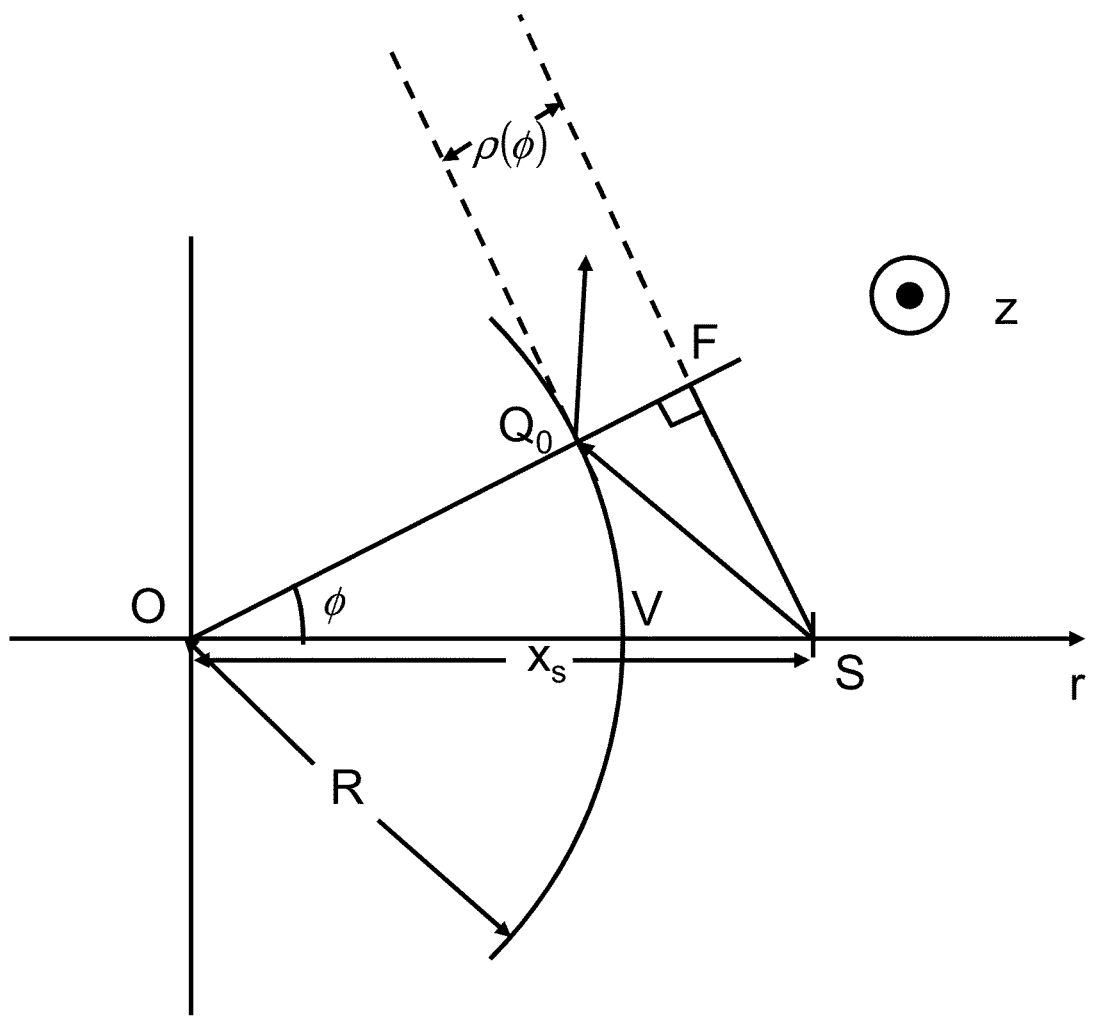
FIG. 7 is a cross sectional view of a reflector along a reference plane in which the reflector is a convex arc at the reference plane, according to an embodiment of the present invention.
Figure 8:
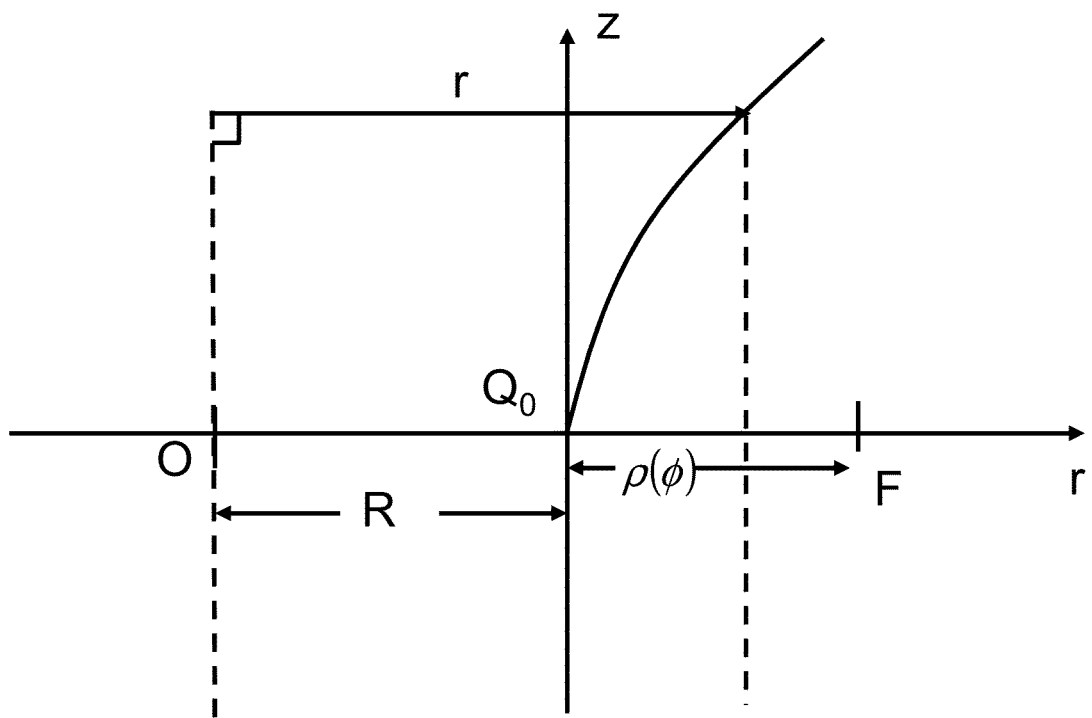
FIG. 8 is a side cross-sectional view of the reflector in FIG. 7 along a non-reference parabolic portion, according to an embodiment of the present invention.

FIGS. 7 and 8 show another specific embodiment that $M(x,y)=0$ is a convex arc. In this case, $\rho(\phi)=(R+L_s)\cos\phi - R$ and the reflective surface is described by $$\frac{z^2}{4\rho(\phi)} = r - R.$$

Combining these two equations, we get $$r = R - \frac{k}{4[R - (R + L_s)\cos\phi]}z^2 \qquad \text{eq. (3)}$$

Figure 9:
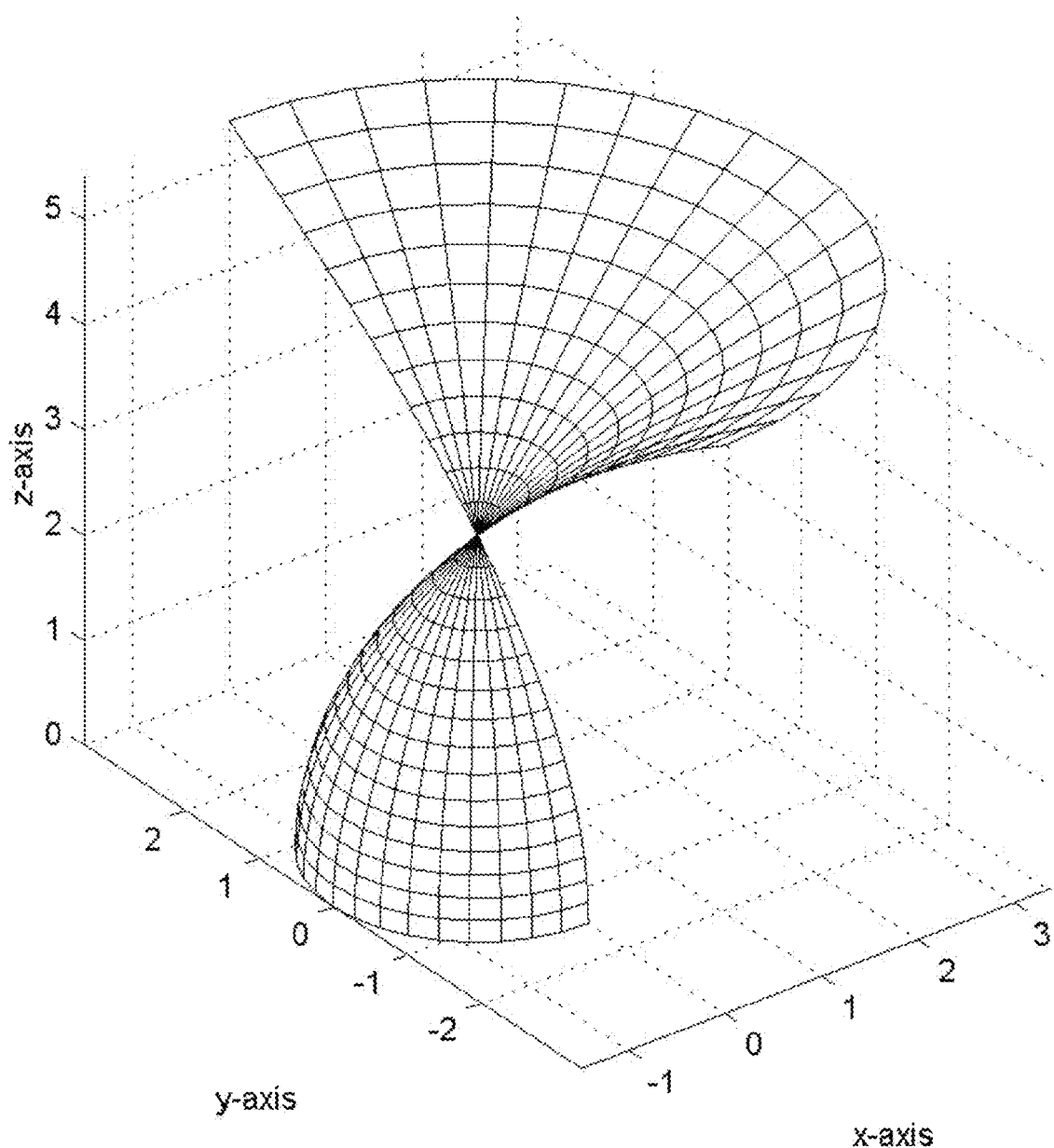
FIG. 9 is a computer-generated graph of a perspective view of a reflector in which the reflector is a concave arc at the reference plane, according to an embodiment of the present invention.

FIG. 9 is a computer-generated graph of a reflective surface using R=Ls, k=1, and φ ranging from π/2 to 3π/2. The reflective surface comprises two portions, one of which is a concave portion for x<0, and another being a convex portion for x>0. The convex portion as mentioned herein is only convex along the x-y plane; it is still parabolic or concave vertically. At R=Ls, the concave portion and the convex portion intersect at x=0 and y=0 at a single point as shown in the figure.

Figure 10:
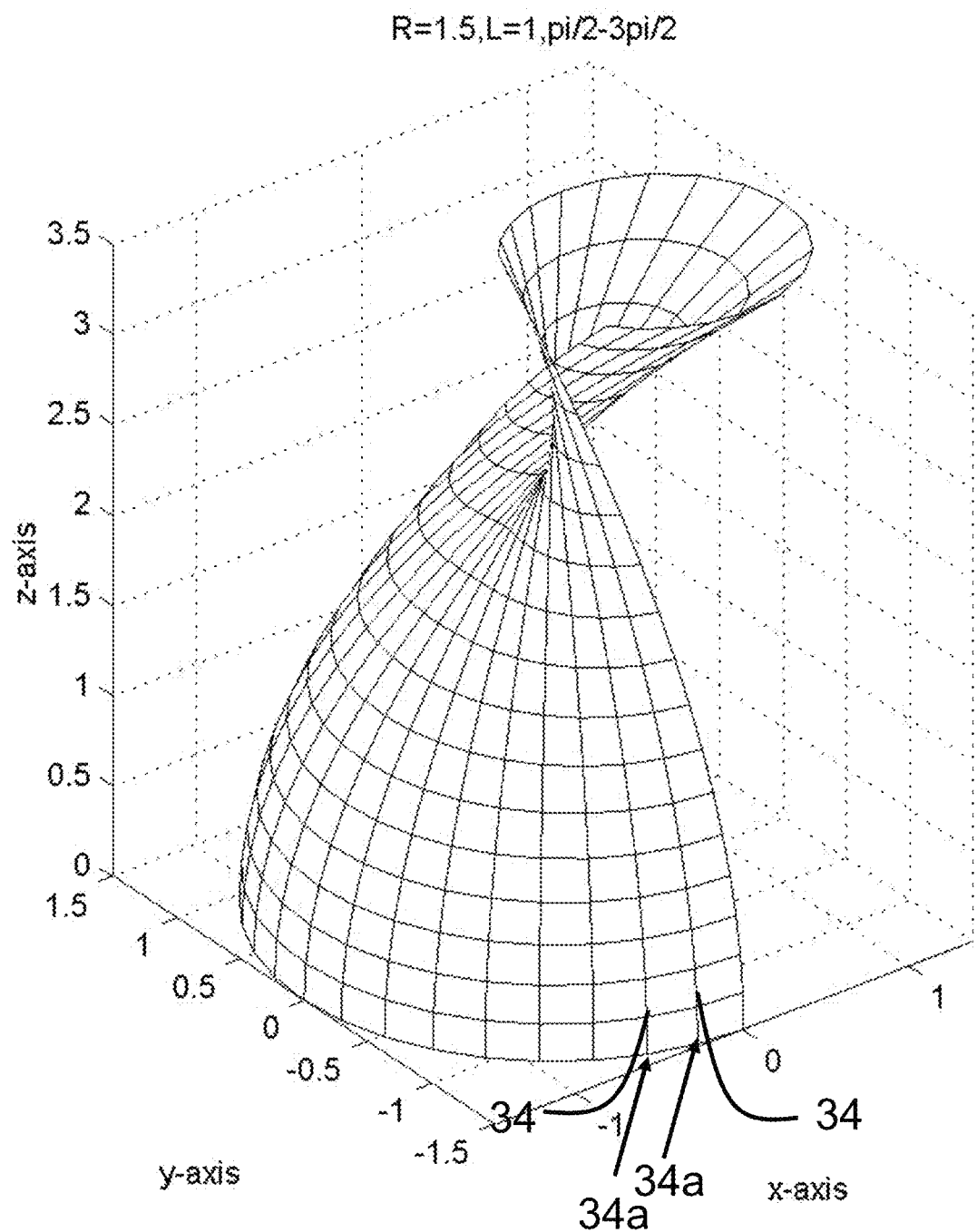
FIG. 10 is a computer-generated graph of a perspective view of a reflector in which the reflector is a concave arc at the reference plane, according to another embodiment of the present invention.
Figure 11:
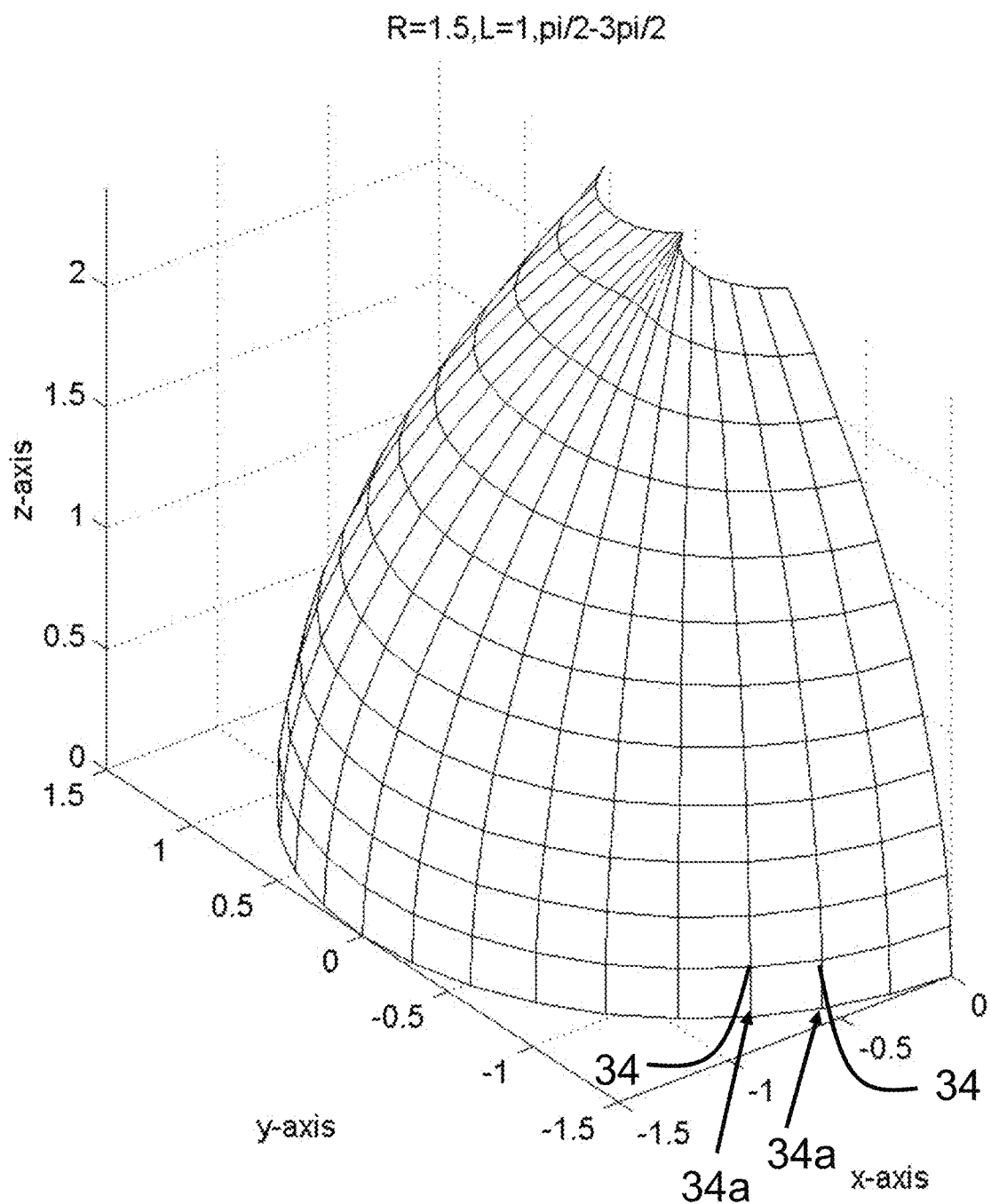
FIG. 11 is a magnified view of a portion of the embodiment as shown in FIG. 10.

FIGS. 10 and 11 show a computer-generated graph of the reflective surface of the embodiment as shown in FIG. 4 using R=1.5Ls and other parameters being the same as those in FIG. 9. This means the source is placed closer than the radius of curvature of M(x,y)=0. As can be seen in FIG. 10, the concave portion and convex portion no longer intersect at a single point, and the reflective surface is in one single continuous piece comprising a concave portion and a convex portion. In FIG. 11, it is also shown that the reflective surface at a non-zero height z is not in any conic shape even if M(x,y)=0 is circular, i.e. conic at z=0. For example, there is a kink present at the top of FIG. 11 along the plane z=2.5.

Figure 12:
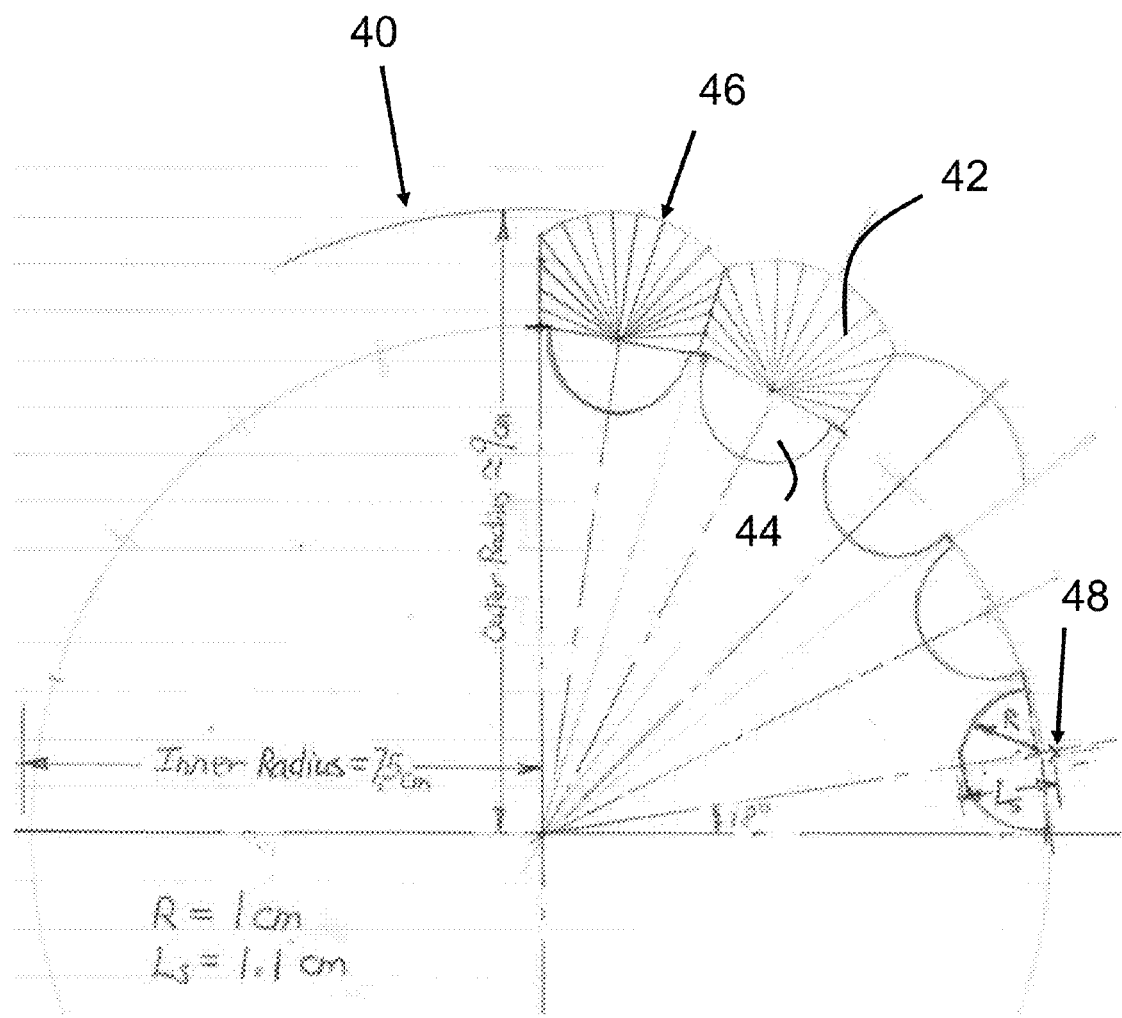
FIG. 12 is a top view of an arrangement of the illumination sources according to the present invention in an obstruction light.

The reflector of the present invention can be utilized in many applications such as obstruction lights. In an obstruction light, often there is a requirement for the output vertical beam spread and radial omnidirectionality. FIG. 12 shows an arrangement of illumination sources 46 in an obstruction light 40. The plurality of illumination sources 46 is arranged uniformly around a circumference of the obstruction light 40. The illumination sources 46 can be placed side by side or a gap can exist between adjacent illumination sources 46. Each illumination source 46 comprises a light source 48 such as a light emitting diode and a reflector as designed using the equations above, and the reflector comprises a concave portion 44 and a convex portion 42 to maximize the light intensity reflected.

In one embodiment, the convex portion 42 is truncated at the sides such that the convex portion 42 of one illumination source is in contact with convex portions 42 of adjacent reflectors when arranged uniformly around the obstruction light 40. The number of illumination sources 46 used depends on the light intensity or luminance required, and it is obvious that the size of each illumination source can be increased or decreased to fit the luminance requirement yet still be arranged uniformly around the obstruction light.

In a specific embodiment, there are 20 illumination sources 46 in the obstruction light 40, with an angle of 18 degrees between each pair of adjacent light sources. In this embodiment, the light source is a light emitting diode. That means the reflectors are arranged side by side as 20 times 18 equals 360 degrees. For each illumination source 46, the light source 48 is placed slightly farther than the origin at Ls=1.1R. In general, a larger Ls:R ratio has lower accuracy requirement in manufacturing, however, the dimension of the obstruction light 40 will also increase, and the percentage of light intensity impinging on the reflector is also reduced as this ratio increases. The reflectors are made of a plastic coated with a metal coating, such as polycarbonate coated with an aluminum coating.

If the desired beam spread is not 0 degrees or parallel to the reference plane, the curvature of the reflector can be adjusted, and the reference plane of the reflector can also be rotated along the plane of the reference parabolic portion using the light emitting diode as the center of rotation, to achieve the desired vertical beam spread. For example, if a vertical beam spread of +4 degrees to +20 degrees to the horizontal is desired, then one can first design a reflector with the reflected beam diverges by ±8 degrees from the reference plane (This can be done, in one embodiment, by setting the constant k to be less than 1). By tilting the reference plane by +12 degrees, the resultant reflector will then give a beam spread of +4 degrees to +20 degrees.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the orientation of the source is not limited. If the source has a non-uniform output profile, such as a light emitting diode which has maximum output at a central light emitting axis and lower output intensity away from the central light emitting axis, the central light emitting axis of the light source can be perpendicular to the reference plane, parallel to the reference plane or at any other angles relative to the reference plane, for example 45 degrees. In one embodiment, the central light emitting axis is at no more than 60 degree from the reference plane towards the reflector 22. The vertical spread is independent of the orientation of the source if the source is a point source.

In the embodiments described above, the reflector 20 is defined for z>=0. One skilled in the art can appreciate that the reflector 20 can also be defined for z<=0 using the teachings of the invention.

In an embodiment, the center point of at least one of the plurality of non-reference parabolic portions does not lie on the reference plane. For example, some non-reference parabolic portions can be shifted vertically upwards or downwards. In another embodiment, the second central axis of at least one of the plurality of non-reference parabolic portions does not align with the reference plane. For example, some non-reference parabolic portions are tilted upwards while the reference parabolic portion stays not tilted. In this case, the vertical spread of the reflected wave at the non-reference parabolic portion is different from that of the reference parabolic portion.

The aforementioned embodiments discuss a reflector that produces reflective rays that are parallel to the horizontal plane (i.e. x-y plane) with a pre-defined horizontal spread from a single radiating source. Based on the teaching of this disclosure, those skilled in the art can also design a reflector that can receive incident rays that are (1) parallel from the horizontal plane and (2) within a pre-defined horizontal spread angle, reflect and concentrate them to the focus point F of FIG. 2a. As mentioned previously, the ray can be light ray, heat ray, electro-magnetic wave or sound wave.

What is claimed is:

1. A reflector comprising a reflective surface; said reflective surface having a shape defined by a plurality of parabolic portions juxtaposing each other; each said plurality of parabolic portions being a parabolic curve determined by a center point, a focus, a focal length which is a distance between said center point and said focus and a central axis which is a line joining said center point and said focus; and said plurality of parabolic portions further comprising a reference parabolic portion and a plurality of non-reference parabolic portions, wherein said plurality of said center points are along a reference line which is not a straight line and said reference line and said foci of said plurality of parabolic portions lie on a reference plane;

wherein each said focus of said plurality of non-reference parabolic portions is derived from said focus of said reference parabolic portion;

wherein electro-magnetic wave generated from any said focus of said plurality parabolic portions is reflected by said reflective surface at a direction parallel to said reference plane.

2. The reflector according to claim 1, wherein each said focus of said plurality of non-reference parabolic portions is an intersection point between said corresponding central axis of said plurality of non-reference parabolic portions and a line drawn from said focus of said reference parabolic portion; said line being perpendicular to said corresponding central axis of said plurality of non-reference parabolic portions.

3. The reflector according to claim 2, wherein said focal lengths of said reference parabolic portion and said plurality of non-reference parabolic portions are scaled by a constant.

4. The reflector according to claim 1, wherein said reflector comprises a concave portion and a convex portion.

5. The reflector according to claim 1, wherein said plurality of parabolic portions is parabolic in a plane perpendicular to said reference plane.

6. The reflector according to claim 1, wherein the shape of said reflective surface of said reflector satisfies the equation $$r = R - \frac{k}{4[R - (R + L_s)\cos\phi]} z^2;$$

wherein r is a horizontal distance between an origin of a 3-dimensional coordinate system and said reflector at a height z, $\phi$ is an angle between said central axis of said reference parabolic portion and said central axis of said non-reference parabolic portion, R is a radius of curvature of said reflector on said reference plane, k is a constant, and $L_s$ is a distance between a source and said center point of said reference parabolic portion.

7. The reflector according to claim 1, wherein said reflector satisfies the equation $$r = R - \frac{k}{4[R + (R - L_s)\cos\phi]} z^2;$$

wherein r is a horizontal distance between an origin of a 3-dimensional coordinate system and said reflector at a height z, $\phi$ is an angle between said central axis of said reference parabolic portion and said central axis of said non-reference parabolic portion, R is a radius of curvature of said reflector on a reference plane, k is a constant, and $L_s$ is a distance between a source and said center point of said reference parabolic portion.

8. A method of designing a reflective surface of a reflector, comprising the steps of:

a) designing a reference line of said reflector; said reference line which is not a straight line lying on a reference plane;

b) picking an arbitrary point on said reference line as a center point of a reference parabolic portion of said reflective surface; said center point being identified as reference point;

c) designing said reference parabolic portion by determining a focus; said focus being a point on a central axis; said central axis being a line which is a normal to a tangent of said reference line at said center point of said reference parabolic portion; and d) designing at least one non-reference parabolic portions of said reflective surface by i) identifying a second point on said reference line as a second center point of said non-reference parabolic portion; said second point being not said reference point;

ii) constructing a second central axis of said non-reference parabolic portion; said second central axis being a normal to a tangent of said reference line at said second point;

iii) determining a second focus of said non-reference parabolic portion wherein said second focus is an intersection point between said second central axis and a line drawn from said focus of said reference parabolic portion; said line being perpendicular to said second central axis.

9. The method according to claim 8, further comprising the step of scaling said focal length of said non-reference parabolic portion and said focal length of said reference parabolic portion; said focal length of said non-reference parabolic portion being a distance between said second center point and said second focus and said focal length of said reference parabolic portion being a distance between said center point and said focus.

10. An obstruction light comprising a plurality of illumination sources, each illumination source comprising:

a) a light reflector comprising a reflective surface; said reflective surface having a shape defined by a plurality of parabolic portions juxtaposing each other; each said plurality of parabolic portions being a parabolic curve determined by a center point, a focus, a focal length which is a distance between said center point and said focus and a central axis which is a line joining said center point and said focus; and said plurality of parabolic portions further comprising a reference parabolic portion and a plurality of non-reference parabolic portions, wherein said plurality of said center points are along a reference line which is not a straight line and said reference line and said foci of said plurality of parabolic portions lie on a reference plane;

wherein each said focus of said plurality of non-reference parabolic portions is derived from said focus of said reference parabolic portion; and b) a light source positioned at any said focus of said plurality parabolic portions, wherein light wave generated from said light source is reflected by said reflective surface at a direction parallel to said reference plane, wherein said plurality of illumination sources are arranged uniformly around a circumference of said obstruction light.

11. The obstruction light according to claim 10, wherein said light source is a light emitting diode.

12. The obstruction light according to claim 10, wherein each said focus of said plurality of non-reference parabolic portions is an intersection point between said corresponding central axis of said plurality of non-reference parabolic portions and a line drawn from said focus of said reference parabolic portion; said line being perpendicular to said corresponding central axis of said plurality of non-reference parabolic portions.

13. The obstruction light according to claim 10, wherein each said light reflector comprises a concave portion and a convex portion.

14. The obstruction light according to claim 10, wherein said plurality of non-reference parabolic portions is parabolic in a plane perpendicular to a reference plane.

15. The obstruction light according to claim 10, wherein said reflector satisfies the equation $$r = R - \frac{k}{4[R - (R + L_s)\cos\phi]} z^2;$$

wherein r is a horizontal distance between an origin of a 3-dimensional coordinate system and said reflector at a height z, $\phi$ is an angle between said central axis of said reference parabolic portion and said central axis of said non-reference parabolic portion, R is a radius of curvature of said reflector on said reference plane, k is a constant, and $L_s$ is a distance between a source and said center point of said reference parabolic portion.

16. The obstruction light according to claim 10, wherein said reflector satisfies the equation $$r = R - \frac{k}{4[R + (R - L_s)\cos\phi]} z^2;$$

wherein r is a horizontal distance between an origin of a 3-dimensional coordinate system and said reflector at a height z, $\phi$ is an angle between said central axis of said reference parabolic portion and said central axis of said non-reference parabolic portion, R is a radius of curvature of said reflector on a reference plane, k is a constant, and $L_s$ is a distance between a source and said center point of said reference parabolic portion.

* * * * *